(12) United States Patent
Da Palma et al.

(10) Patent No.: US 8,027,839 B2
(45) Date of Patent: Sep. 27, 2011

(54) USING AN AUTOMATED SPEECH APPLICATION ENVIRONMENT TO AUTOMATICALLY PROVIDE TEXT EXCHANGE SERVICES

(75) Inventors: William V. Da Palma, Coconut Creek, FL (US); Baiju D. Mandalia, Boca Raton, FL (US); Victor S. Moore, Lake City, FL (US); Wendi L. Nusbickel, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 1259 days.

(21) Appl. No.: 11/612,996

(22) Filed: Dec. 19, 2006

(65) Prior Publication Data

US 2008/0147395 A1 Jun. 19, 2008

(51) Int. Cl.
*G10L 21/00* (2006.01)
(52) U.S. Cl. .................................. 704/270.1
(58) Field of Classification Search ............ 704/270.1, 704/275
See application file for complete search history.

(56) References Cited

U.S. PATENT DOCUMENTS

| | | | |
|---|---|---|---|
| 5,745,904 A | 4/1998 | King et al. | |
| 6,012,030 A | 1/2000 | French-St. George et al. | |
| 6,292,769 B1 | 9/2001 | Flanagan et al. | |
| 6,339,754 B1 | 1/2002 | Flanagan et al. | |
| 6,385,596 B1 | 5/2002 | Wiser et al. | |
| 6,430,604 B1 | 8/2002 | Ogle et al. | |
| 6,735,287 B2 | 5/2004 | Vishik et al. | |
| 6,816,578 B1 * | 11/2004 | Kredo et al. | 379/88.17 |
| 6,876,728 B2 | 4/2005 | Kredo et al. | |
| 6,895,084 B1 | 5/2005 | Saylor et al. | |
| 7,058,036 B1 | 6/2006 | Yu et al. | |
| 7,065,185 B1 | 6/2006 | Koch | |
| 7,103,644 B1 | 9/2006 | Zhang et al. | |
| 7,130,404 B2 | 10/2006 | Coles et al. | |
| 7,606,714 B2 * | 10/2009 | Williams et al. | 704/275 |
| 7,702,798 B2 * | 4/2010 | Apreutesei et al. | 709/227 |
| 7,724,880 B2 * | 5/2010 | Forney et al. | 379/88.18 |

(Continued)

FOREIGN PATENT DOCUMENTS

CA 2281147 2/2001

(Continued)

OTHER PUBLICATIONS

Olsson, D., et al., "MEP—A Media Event Platform", Mobile Networks and Applications, Kluwer Academic Publishers, vol. 7, No. 3, pp. 235-244, 2002.

(Continued)

*Primary Examiner* — Michael N Opsasnick
(74) *Attorney, Agent, or Firm* — Wolf, Greenfield & Sacks, P.C.

(57) ABSTRACT

The present solution includes an automated response method. The method can receive user interactions entered through a real-time text exchange interface. These user interactions with the speech application can be dynamically and automatically converted as necessary into a format consumable by a voice server. A text input API of a voice server can be used to allow the voice server to directly accept text input. Further, automated interactions can be received from the voice server, which are dynamically and automatically converted into a format accepted by the text exchange interface. The text exchange interface can be an off-the-shelf unmodified interface. The speech application can be a VoiceXML based application that lacks an inherent text exchange capability.

20 Claims, 2 Drawing Sheets

U.S. PATENT DOCUMENTS

| | | | |
|---|---|---|---|
| 7,734,023 B2 * | 6/2010 | Bettis et al. | 379/88.25 |
| 2001/0049603 A1 | 12/2001 | Sravanapudi et al. | |
| 2002/0021307 A1 | 2/2002 | Glenn | |
| 2002/0052747 A1 | 5/2002 | Sarukkai | |
| 2002/0069069 A1 | 6/2002 | Kanevsky et al. | |
| 2002/0144233 A1 | 10/2002 | Chong et al. | |
| 2002/0193994 A1 | 12/2002 | Kibre et al. | |
| 2003/0002633 A1 | 1/2003 | Kredo et al. | |
| 2003/0046316 A1 | 3/2003 | Gergic et al. | |
| 2003/0125958 A1 | 7/2003 | Alpdemir et al. | |
| 2003/0126330 A1 | 7/2003 | Balasuriya | |
| 2003/0187660 A1 | 10/2003 | Gong | |
| 2004/0003041 A1 | 1/2004 | Moore et al. | |
| 2004/0054740 A1 | 3/2004 | Daigle et al. | |
| 2004/0073431 A1 | 4/2004 | Galanes et al. | |
| 2004/0083479 A1 * | 4/2004 | Bondarenko et al. | 719/310 |
| 2004/0101122 A1 * | 5/2004 | Da Palma et al. | 379/219 |
| 2004/0104938 A1 | 6/2004 | Saraswat et al. | |
| 2004/0109541 A1 | 6/2004 | Celi et al. | |
| 2004/0205175 A1 * | 10/2004 | Kammerer | 709/223 |
| 2004/0240650 A1 | 12/2004 | Bear et al. | |
| 2004/0246331 A1 | 12/2004 | Caspi et al. | |
| 2005/0021826 A1 * | 1/2005 | Kumar | 709/232 |
| 2005/0027538 A1 | 2/2005 | Halonen et al. | |
| 2005/0069102 A1 * | 3/2005 | Chang | 379/88.18 |
| 2005/0074101 A1 | 4/2005 | Moore et al. | |
| 2005/0137875 A1 | 6/2005 | Kim et al. | |
| 2005/0171664 A1 | 8/2005 | Konig | |
| 2005/0193332 A1 * | 9/2005 | Dodrill et al. | 715/513 |
| 2007/0005366 A1 | 1/2007 | Sravanapudi et al. | |
| 2008/0059152 A1 | 3/2008 | Fridman et al. | |
| 2008/0147406 A1 | 6/2008 | Da Palma et al. | |
| 2009/0013035 A1 | 1/2009 | Hosn et al. | |

FOREIGN PATENT DOCUMENTS

| | | |
|---|---|---|
| EP | 0999685 | 5/2000 |
| FR | 2844127 A1 | 3/2004 |
| TW | 499671 | 8/2002 |
| TW | 527825 | 4/2003 |
| TW | 536888 | 6/2003 |
| TW | 542997 | 7/2003 |
| WO | WO 0135615 | 5/2001 |
| WO | WO 0243360 | 5/2002 |

OTHER PUBLICATIONS

Meng, H., et al., "ISIS: An Adaptive, Trilingual Conversational System With Interleaving Interaction and Delegation Dialogs", ACM Transactions on Computer Human Interaction, vol. 11, No. 3, pp. 268-299, Sep. 2004.

"Jabberwacky—About Thoughts—An Artificial Intelligence AI chatbot, chatterbot or chatterbox," 1997-2006 Rollo Carpenter.

"Today Translations, Breaking the Web Barrier," Surfocracy, 2006.

Meng, H., et al. "ISIS: An Adaptive, Trilingual Conversational System With Interleaving Interaction and Delegation Dialogs," ACM Transactions on Computer Human Interaction, vol. 11, No. 3, pp. 268-299, Sep. 2004.

Olsson, D., et al., "MEP—A Media Event Platform," Mobile Networks and Applications, Kluwer Academic Publishers, Vo. 7, No. 3, pp. 235-244, 2002.

Waibel et al., "Multimodal interfaces for multimedia information agents," Acoustics Speech, and Signal Processing, 1997. ICASSP-97, 1997 *IEEE International Conference* on (0-8186-7919-0) 1997. vol. 1; p. 170 vol. 1-170 vol. 1.

* cited by examiner

USING AN AUTOMATED SPEECH APPLICATION ENVIRONMENT TO AUTOMATICALLY PROVIDE TEXT EXCHANGE SERVICES

BACKGROUND

1. Field of the Invention

The present invention relates to the field of automated speech systems and, more particularly, to using an automated speech application environment to automatically provide text-based interactive services.

2. Description of the Related Art

Interactive Voice Response (IVR) systems are often used to provide automated customer service via a voice channel of a communication network. IVR systems permit routine customer requests to be quickly, efficiently, and automatically handled. When a request is non-routine or when a caller has difficulty with the IVR system, a transfer can be made from the IVR system to a customer service representative. Even when human interactions are needed, the IVR system can obtain necessary preliminary information, such as an account number and a reason for a call, which can ensure callers are routed to an appropriate human agent and to ensure human-to-human interactive time is minimized. Successful use of IVR systems allows call centers to be minimally manned while customers are provided a high level of service with relatively low periods spent in waiting queues.

IVR systems, especially robust ones having natural language understanding (NLU) capabilities and/or large context free grammars, represent a huge financial and technological investment. This investment includes costs for purchasing/leasing and maintaining IVR infrastructure hardware, IVR infrastructure software, and voice applications executing upon this infrastructure. An additional and significant reoccurring cost can relate to maintaining a sufficient number of voice quality channels to handle anticipated call volume. Further, each of these channels consumes an available port of a voice server, which has a limited number of costly ports. Each channel also consumes a quantity of bandwidth needed for establishing a voice quality channel between a caller and the IVR system.

No conventional solution permits this expensive IVR infrastructure to be leveraged to handle customer service interactions over other communications channels, such as a chat channel or an instant messaging channel. Instead, implementing a chat channel using conventional techniques requires a separate investment in a separate infrastructure. That is, new costs for purchasing and maintaining chat infrastructure hardware, chat infrastructure software, and chat applications executing upon this infrastructure are incurred.

SUMMARY OF THE INVENTION

A solution for using an infrastructure of an automated speech application environment to automatically provide real-time text-based interactive services. More specifically, the present solution utilizes a chat robot object, referred to as a Chatbot, executing a speech application, to dynamically convert text received from a text exchange client to input consumable by a voice server and to dynamically convert output from the speech application to text appropriately formatted for the client. A text exchange client can be a chat client, an Instant Messaging (IM) client, a text messaging client, or any other real-time text communication client.

In one embodiment, the solution can use unmodified, off-the-shelf text exchange software, such as SAMETIME, TRILLIAN, YAHOO! MESSENGER, and the like. Moreover, the solution can also utilize unmodified speech application environments executing unmodified speech applications, such as pre-existing VoiceXML applications that were designed for speech-only interactions. Further, the present solution does not require special devices, protocols, or other type of communication artifacts to be utilized.

The present invention can be implemented in accordance with numerous aspects consistent with the material presented herein. For example, one aspect of the present invention can include an automated response method. The method can receive user interactions entered through a real-time text exchange interface. These user interactions with the speech application can be dynamically and automatically converted as necessary into a format consumable by a voice server. In one embodiment, a text input API of the Voice Server can be used to directly accept text input. Further, automated interactions can be received from the voice server, which are dynamically and automatically converted into a format accepted by the text exchange interface. For example, voice markup produced by the speech application can be converted into pure text. The text exchange interface can be an off-the-shelf unmodified interface. The speech application can be a VoiceXML based application that lacks an inherent text exchange capability.

Another aspect of the present invention can include a method for extending an automated speech application environment to provide text exchange services. The method can involve an automated speech application environment and a text exchange client. The automated speech application environment can execute automated speech response applications that permit users to interact in real-time over a voice channel. The text exchange client can interact in real-time over a text exchange channel with another text exchange device. In the method, a communication session can be established between the speech application environment and the text exchange client. The communication session can include a server channel to the automated speech application environment and it can include a text exchange channel to the text exchange client. Interactions can be dynamically and automatically converted between the server channel and the text exchange channel during the communication session.

Still another aspect of the present invention can include a system for providing text exchange services including a text exchange client, a speech application environment, and a Chatbot server. The text exchange client can send and receive real-time text exchanges over a text exchange channel. The speech application environment can execute an automated speech response application that permits users to interact in real-time over a voice channel. The Chatbot server can establish a communication session involving the text exchange client and the automated speech response application. The Chatbot server can dynamically convert messages between the text exchange client and the speech application environment during the communication session.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
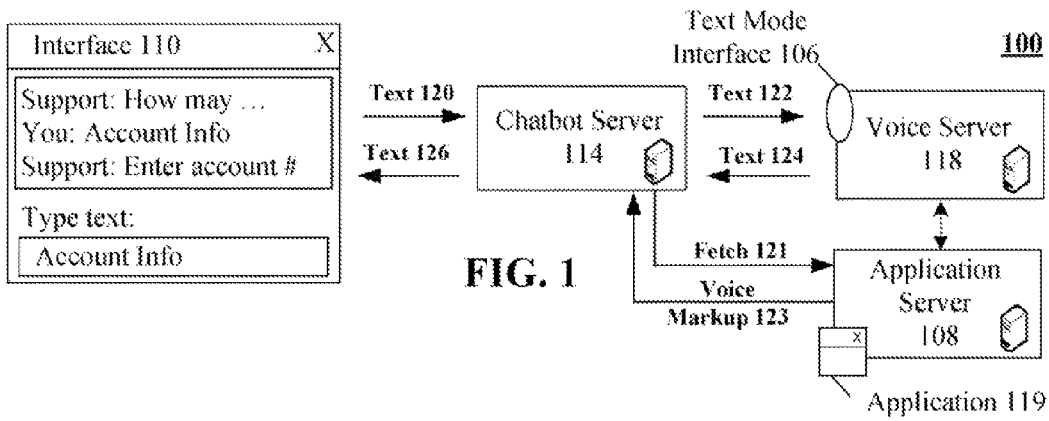
FIG. 1 is a schematic diagram of a system for a Chatbot server that permits dynamic interactions between a text exchange interface and a speech-enabled application in accordance with an embodiment of the inventive arrangements disclosed herein.

FIG. 1 is a schematic diagram of a system 100 for a Chatbot server 114 that permits dynamic interactions between a text exchange interface 110 and a speech-enabled application 119 in accordance with an embodiment of the inventive arrangements disclosed herein. System 100 permits automated interactions between a text exchange client 110 and a speech-enabled application 119.

The speech-enabled application 119 can be a VoiceXML application, such as an application for an Interactive Voice Response System (IVR) often deployed at contact centers. The text exchange client interface 110 can be an interface for any type of text exchange communications, such as Instant Message (IM) communications, chat communications, text-messaging using SAMETIME, TRILLIAN, YAHOO! MESSENGER, and the like.

The voice server 118, like most voice servers, can include a text mode interface 106, which is typically used by developers, system maintainers, and/or trainers of a speech recognition engine. For example, a set of proprietary, restricted, or standardized (e.g., MRCPv2 INTERPRET) Application Program Interfaces (APIs) can be used for the interface 106. This set of APIs, which are typically not available or accessible within a production environment, can be enabled to create a text input channel that consumes considerably fewer computing resources that a voice channel, which is typically established with the voice server 118 operating in a production environment. In most cases, the text module interface 106 is present, but dormant, within production voice servers 118. Interface 106 can be enabled for text based interactions with Chatbot server.

Use of interface 106 occurs in a manner transparent to the application server 108 and therefore has no affect on application 119. That is, application 119 and application server 108 remain unaware that the voice server 118 is processing text input via interface 106, as opposed to voice input. The output produced by voice server 118 and sent to Chatbot server 114 can be the same in either case. Further, the output produced by the application server 108 and sent to the Chatbot server 114 is the same. Thus, multiple communication sessions, some being text-based sessions that use interface 106 and others being voice based sessions can be concurrently handled by application server 108. System 110 can be implemented without infrastructure changes to application server 108 (and without changes to voice server 118 assuming interface 106 is present) and without changing code of speech enabled applications 119. This is true, even though the application 119 may lack explicitly coded support for text exchange interactions and would be unable to support such interactions without the disclosed invention. Further, the text exchange interface 110 can be any off-the-shelf text exchange software, which needs not be modified to operate as shown in system 100.

In system 100, the Chatbot server 114 can fetch 121 voice markup 123 associated with a speech enabled application 119, which it executes. The Chatbot server 114 can also relay textual input 120 from interface 110 to send text 122 consumable by voice server 118 via interface 106. The voice server 118 can match the input against a recognition grammar and generate text output 124 for the Chatbot server 114. The Chatbot server 114 can use this output 124 when it executes the application. The application 119 processes this output, which can produce a responsive output, typically in a form of a Voice markup segment, such as VoiceXML (which can further employ the use of the W3C Speech Synthesis Markup Language or SSML). When performing text exchange operations, normal speech synthesis operations performed by the voice server 118 can be bypassed. The Chatbot server 114 can dynamically convert the responsive output from the markup into textual output 126, which interface 110 handles. For example, textual content contained between markup tags can be extracted from the application 119 markup (i.e., the markup tags can be omitted) and included within a text 126 message.

Unlike automated communications reliant upon voice channels, such as communications involving a conventional use of voice server 118, text-messaging communications via Chatbot server 114 require few hardware resources to duplicate capacity of taking simultaneous customer requests. This allows system 110 to handle a greater volume of requests using the same infrastructure while decreasing customer wait time. Additionally, text interactions and voice interactions with voice server 118 have a different dynamic. For example, customers using text exchange interface 110 are not required to answer questions in a rushed manner, which permits more thoughtful and accurate input, which can result in more relevant responses that in-turn results in increased customer satisfaction.

Figure 2:
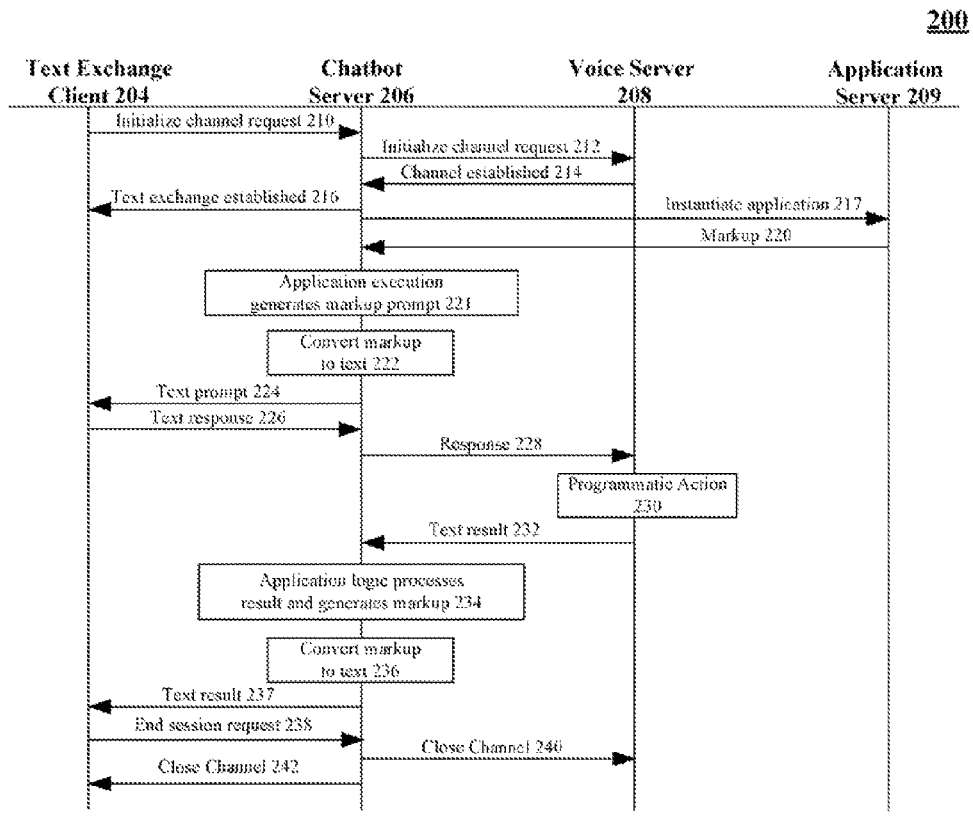
FIG. 2 is a process flow diagram showing interactions between a text exchange client, a Chatbot server, a voice server, and an application server in accordance with an embodiment of the inventive arrangements disclosed herein.

FIG. 2 is a process flow diagram 200 showing interactions between a text exchange client 204, a Chatbot server 206, a voice server 208, and an application server 209 in accordance with an embodiment of the inventive arrangements disclosed herein.

The voice server 208 can include a text input API, which is typically used by developers, system maintainers, and/or trainers of a speech recognition engine. This set of APIs, which are typically not available or accessible within a production environment, can be enabled to permit the voice server 208 to directly consume text, which requires considerably fewer computing resources than those needed to process voice input, which server 208 typically receives.

As shown, client 204 can send a request 210 to Chatbot server 206 to initialize a text modality channel. Chatbot server 206 can send a channel initialization message 212 to voice server 208, to establish a session. Server 208 can positively respond, causing a channel 214 to be established between servers 206 and 208. Chatbot server 206 can then establish the requested text channel 216 with client 204. After step 216, the Chatbot server 206 can send a request 217 to application server 209, which causes a speech enabled application to the instantiated. That is, application markup 220 can be conveyed to Chatbot server 206 for execution.

Application initiated prompt 221 can occur, when the ChatBot Server 206 executes the speech enabled application 119. Server 206 can convert 222 markup provided by application 119 into pure text, represented by text prompt 224, which is sent to client 204. For example, prompt 221 can be written in markup and can include:

<prompt>text context</prompt>.

The converting 222 can extract the text context (omitting the markup tags) and generate a text prompt 224, which only includes the text context. Client 204 can respond 226 to the prompt via the text channel. Server 206 can relay response 228, which can be identical to response 226, to voice server 208. The voice server 208 can match response 228 against a speech grammar via programmatic action 230, which results in text result 232. The voice server 208 can convey text result 232 to the Chatbot server 206. Chatbot server 206 uses this output 232 when it executes the application logic 243 of executing Application 119, which results in markup being generated. The Chatbot server 206 can convert 236 textural content contained within generated markup into a text result 237, which is sent to client 204.

Interactions can continue in this fashion until client 204 sends a request 238 to end the communication session. Chatbot server 206 can responsively close 240 the channel between it and voice server 208. The Chatbot server 206 can also close 242 the text exchange channel between it and client 204, at which point the communication session is terminated.

Figure 3:
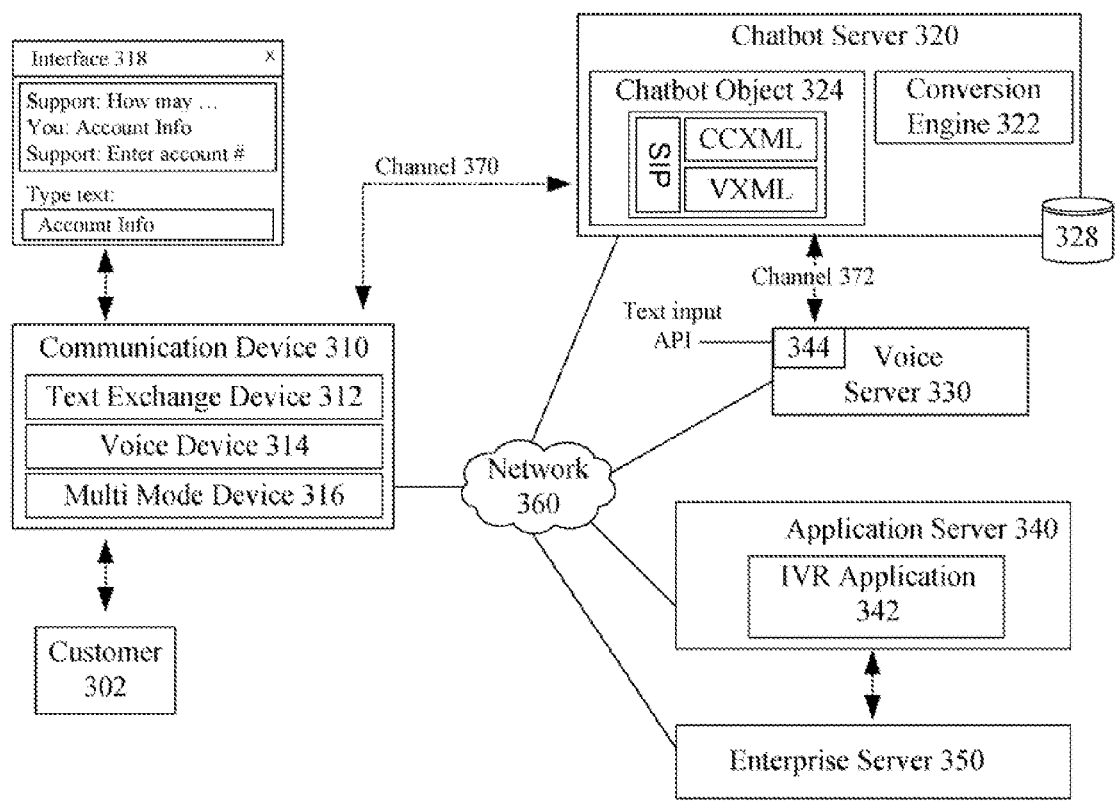
FIG. 3 is a schematic diagram of a system for providing text exchange services using a Chatbot server and a speech application server in accordance with an embodiment for the inventive arrangements disclosed herein.

FIG. 3 is a schematic diagram of a system for providing text exchange services using Chatbot server 320 and a speech application server 340 in accordance with an embodiment for the inventive arrangements disclosed herein. The system can include a network 360, which communicatively links communication device 310, Chatbot server 320, voice server 230, application server 340, and enterprise server 350.

Network 360 can include any of a variety of components, wired and/or wireless, that together permit digitally encoded information contained within carrier waves to be conveyed from any communicatively linked component to any other communicatively linked component.

The communication device 310 can be any communication device linking a customer 302 to network 360. Devices 310 can include, for example, mobile telephones, line-based phones, computers, notebooks, computing tablets, personal data assistants (PDAs), wearable computing devices, entertainment systems, interactive media devices, and the like. Specific categories of devices 310 include a text exchange device 312, a voice communication device 314, and a multi mode device 316.

A text exchange device 312 is a computing device capable of real-time interactive text exchanges. These text exchanges include online chatting, instant messaging, and text message. A communication device 314 can be any device capable of real-time voice communication over network 360. This includes VoIP based communications, traditional circuit switched communications, two-way radio communications, and the like. A multi mode device 316 is a device capable of engaging in text exchanges and in voice communications. Some multi mode devices 316 are restricted to one mode of communication at a time, while others are able to communicate across multiple modes concurrently.

When performing text exchanges, device 310 can use an interface 318. The interface 318 can show a running textual dialogue and can include a section to enter new text. Interface 318 can be an interface for an instant messaging client, a chat client, and/or a text-messaging client.

Chatbot server 320 can be a VoiceXML server or equivalent device that dynamically converts text exchange messages from device 310 to message consumable by voice server 330. Use of a text input API 344, which lets voice server 330 accept text, may permit text from device 310 to be directly consumed by voice server 330. Chatbot server 320 can also dynamically convert output from voice server 330 to output consumable by the speech application, and then making it presentable within interface 318.

For each managed communication session, the Chatbot server 320 can instantiate a Chatbot object 324. The Chatbot object 324 can include a SIP servlet and one or more interpreters, such as a Call Control Extensible Markup Language (CCXML) interpreter, a Voice Extensible Markup Language (VoiceXML) interpreter, as Extensible Hypertext Markup Language (XML) plus voice profiles (X+V) interpreter, a Speech Application Language Tags (SALT) interpreter, a Media Resource Control Protocol (MCRP) interpreter, a customized markup interpreter, and the like. The SIP servlet can map incoming SIP requests to appropriate interpreters.

A communication session handled by Chatbot object 324 can involve multiple different communication channels, such as channel 370 and channel 372. Channel 370 can be a communication channel established between Chatbot server 320 and device 310. Channel 372 can be a communication channel established between Chatbot server 320 and voice server 330. Appreciably, application server 340 is not aware of a communication modality and channel type that a customer 302 uses to communicate with server 320. A special text input API 344 can be used to permit voice server 330 to directly consume textual input provided by Chatbot server 320.

The conversion engine 322 of server 320 can perform any necessary conversions to adapt output from text exchange device 312 to input consumable by voice server 330. Typically, no significant conversions are necessary for text consumed by the voice server 330, which provides access to text mode interaction functions via API 344. Appreciably, text mode interaction functions are typically used by developers during a testing and development stage, but are being used here at runtime to permit the voice server 330 to directly handle text. For example, the Internet Engineering Task Force (IETF) standard Media Resource Control Protocol version 2 (MRCPv2) contains a text mode interpretation function called INTERPRET for the Speech Recognizer Resource, which would permit the voice server 330 to directly handle text.

The application server 340 will typically generate voice markup output, such as VoiceXML output, which a voice server 330 converts to audio output. The conversion engine 322 can extract text content from the voice markup and can convey the extracted text to communication device 310 over channel 370.

Application server 340 can be an application server that utilizes modular components of a standardized runtime platform. The application server 340 can represent a middleware server of a multi-tier environment. The runtime platform can provide functionality for developing distributed, multi-tier, Web-based applications. The runtime platform can also include a standard set of services, application programming interfaces, and protocols. That is, the runtime platform can permit a developer to create an enterprise application that is extensible and portable between multiple platforms. The runtime platform can include a collection of related technology specifications that describe required application program interfaces (APIs) and policies for compliance.

In one embodiment, the runtime platform can be a JAVA 2 PLATFORM ENTERPRISE EDITION (J2EE) software platform. Accordingly, the application server 340 can be a J2EE compliant application server, such as a WEBSPHERE application server from International Business Machines Corporation of Armonk, N.Y., a BEA WEBLOGIC application server from BEA Systems, Inc. of San Jose, Calif., a JBOSS application server from JBoss, Inc. of Atlanta, Ga., a JOnAS application server from the ObjectWeb Consortium, and the like. The runtime platform is not to be construed as limited in this regard and other software platforms, such as the .NET software platform, are contemplated herein.

The IVR application 342 can be an application that permits callers to interact and receive information from a database of an enterprise server 350. Access to the voiceXML server 320 (which has been extended for Chatbot 320) can accept user input using touch-tone signals, voice input, and text input. The IVR application 342 can provide information to the user in the form of a single VoiceXML application that can be used by any modality, including DTMF, voice, and chat. The voice markup can also be directly conveyed to conversion engine 322, where it is converted to text presentable in interface 318.

The IVR application 342 can present a series of prompts to a user and can receive and process prompt responses in accordance with previously established dialogue menus. Speech processing operations, such as text-to-speech operations, speech-to-text operations, caller identification operations, and voice authorization operations can be provided by a remotely located voice server 330. Without the intervention of Chatbot server 320, IVR application 342 would be unable to interact with a text exchange device 312, since it lacks native coding for handling text exchange input/output.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. An automated response method comprising:
   receiving user interactions relating to text exchanges entered through a real-time text exchange interface;
   executing an unmodified speech enabled application in an automated speech application environment;
   establishing a communication session between the automated speech application environment and a text exchange client, wherein the communication session includes a text exchange channel to the text exchange interface and a server channel to a voice server in the automated speech application environment; and
   during the communication session:
     dynamically and automatically converting the user interactions with the speech enabled application into a format consumable by the voice server;
     dynamically and automatically converting output from the voice server into output directly usable by the speech enabled application; and
     converting output from the speech enabled application into a format presentable in the text exchange interface.

2. The method of claim 1, wherein the method is performed in a production environment, and wherein the voice server includes an Application Program Interface (API) for handling text input.

3. The method of claim 1, wherein the voice server uses a text input API, which permits the voice server to directly consume text input, and wherein the converting of the voice markup extracts the text content, which is directly presentable in the text exchange interface.

4. The method of claim 3, wherein the text exchange interface is an instant messaging interface, a chat interface, and/or a text messaging interface.

5. The method of claim 1, wherein the voice server is configured to concurrently handle a plurality of communication sessions, said sessions including at least one session involving the text exchange interface and at least one session involving a human using a voice interface.

6. The method of claim 1, wherein the speech application is a single modality application written in a voice markup language, and wherein the interactions sent from and received by the text exchange interface are text based interactions.

7. The method of claim 1, wherein the speech application is a VoiceXML based application.

8. The method of claim 1, wherein the text exchange interface is an off-the-shelf unmodified interface, and wherein the speech application is a standard speech enabled application that lacks an inherent text exchange capability.

9. The method of claim 1, wherein the steps of claim 1 are steps performed automatically by at least one machine in accordance with at least one computer program having a plurality of code sections that are executable by the at least one machine.

10. The method of claim 1, wherein the steps of claim 1 are performed by a service agent and/or a computing device manipulated by the service agent, the steps being performed in response to a service request.

11. A method for extending an automated speech application environment to provide text exchange services comprising:
   establishing a communication session between an automated speech application environment and a text exchange client, wherein the communication session includes a server channel to the automated speech application environment, wherein the communication session includes a text exchange channel to the text exchange client, wherein the automated speech application environment is configured to execute automated speech response applications that permit users to interact in real-time over a voice channel and wherein the text exchange client is configured to interact in real-time over a text exchange channel with another text exchange device; and dynamically and automatically converting interactions between the server channel and the text exchange channel during the communication session.

12. The method of claim 11, wherein at least one of the automated speech response applications is a VoiceXML based application, wherein a text input API of a voice server included in the speech application environment is used to accept text based input.

13. The method of claim 11, further comprising:

automatically converting voice markup containing text content received from the server channel into text messages including the text content, which are conveyed over the text exchange channel.

14. The method of claim 11, wherein the text exchange interface is an instant messaging interface, a chat interface, and/or a text messaging interface.

15. The method of claim 11, wherein the text exchange interface is an off-the-shelf unmodified interface, and wherein the speech application environment includes at least one standard speech enabled application that lacks an inherent text exchange capability.

16. The method of claim 11, wherein the method is performed automatically by at least one machine in accordance with at least one computer program having a plurality of code sections that are executable by the at least one machine.

17. A system for providing text exchange services comprising:

a text exchange client configured to send and receive real-time text exchanges over a text exchange channel;

a speech application environment configured to execute an automated speech response application that permits users to interact in real-time over a voice channel; and a Chatbot server configured to establish a communication session involving the text exchange client and the automated speech response application, wherein the Chatbot server can dynamically convert messages between the text exchange client and the speech response application during the communication session in a manner transparent to the text exchange client and to the automated speech response application.

18. The system of claim 17, wherein speech application environment includes an Application Program Interface (API) for handling text input, which the Chatbot server conveys.

19. The system of claim 17, wherein the speech application environment supports a plurality of concurrently executing communication sessions using the automated speech response application, wherein at least one of the concurrently executing communication sessions is a text exchange communication with the text exchange client, and wherein at least one of the concurrently executing communication sessions is a voice based communication session with a user conducted over the voice channel.

20. The system of claim 17, wherein the text exchange interface is an off-the-shelf unmodified interface, and wherein the automated speech response application is a VoiceXML based application that lacks an inherent text exchange capability.

* * * * *